(12) United States Patent
Clift

(10) Patent No.: US 10,764,640 B2
(45) Date of Patent: Sep. 1, 2020

(54) RECEIVER DEVICE INCLUDING NATIVE BROADCASTER APPLICATION

(71) Applicant: SONY CORPORATION, Tokyo (JP)

(72) Inventor: Graham Clift, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 16/199,027

(22) Filed: Nov. 23, 2018

(65) Prior Publication Data

US 2020/0169788 A1 May 28, 2020

(51) Int. Cl.
| | |
|---|---|
| H04N 21/462 | (2011.01) |
| H04N 21/414 | (2011.01) |
| H04N 21/858 | (2011.01) |
| H04N 21/443 | (2011.01) |
| H04N 21/431 | (2011.01) |

(52) U.S. Cl.
CPC ... *H04N 21/4622* (2013.01); *H04N 21/41407* (2013.01); *H04N 21/4312* (2013.01); *H04N 21/4431* (2013.01); *H04N 21/8586* (2013.01)

(58) Field of Classification Search
CPC ......... H04N 21/4622; H04N 21/41407; H04N 21/8586; H04N 21/4431; H04N 21/4312
See application file for complete search history.

(56) References Cited

U.S. PATENT DOCUMENTS

| | | | | |
|---|---|---|---|---|
| 9,699,524 | B2* | 7/2017 | Kang | ............... H04N 21/437 |
| 2009/0257738 | A1 | 10/2009 | Park et al. | |
| 2015/0121431 | A1* | 4/2015 | Jacoby | ............ H04N 21/458 |
| | | | | 725/59 |
| 2016/0044366 | A1* | 2/2016 | McCarthy | .......... H04N 21/6125 |
| | | | | 725/47 |
| 2017/0289597 | A1* | 10/2017 | Riedel | ............... H04N 21/2668 |
| 2019/0200099 | A1 | 6/2019 | Misra et al. | |

FOREIGN PATENT DOCUMENTS

WO    WO 2018/002873 A1    1/2018

OTHER PUBLICATIONS

Waqer Zia et al., "Demonstrating ATSC Route-Dash Delivery", Proceeding MMSys '16 Proceedings of the 7th International Conference on Multimedia Systems, Article No. 40, May 10-13, 2016, 4 pages.
International Search Report and Written Opinion dated Dec. 5, 2019, in PCT/IB2019/058626 citing documents AA-AB, AO and AX therein, 10 pages.
DVB Organization, "A332-2017a-Service Announcement-2.pdf", Digital Video Broadcasting, XP017855624, Aug. 3, 2018, 34 pages.

* cited by examiner

*Primary Examiner* — Oschta I Montoya
(74) *Attorney, Agent, or Firm* — Oblon, McClelland, Maier & Neustadt, L.L.P.

(57) ABSTRACT

A reception apparatus includes a memory that stores a television receiver application and a native application. The reception apparatus further includes a processor configured to send, by the native application to the television receiver application, a query command regarding a number of services available for display, receive, by the native application from the television receiver application in response to the query command, a query response message including at least a first parameter that specifies a number of associated services available for display, and provide, by the native application, a video surface for each service indicated in the first parameter.

12 Claims, 12 Drawing Sheets

RECEIVER DEVICE INCLUDING NATIVE BROADCASTER APPLICATION

BACKGROUND

Technical Field

The present disclosure relates generally to a digital television (DTV) receiver hardware device for terrestrial broadcasts, and in particular, a native broadcaster application to execute in conjunction or in place of broadcaster applications.

Description of the Related Art

Advanced Television Systems Committee (ATSC) 3.0 is a suite of standards developed for delivering television services. ATSC 3.0 is non-backward-compatible with the existing digital television service in the US, which is sometimes referred to as "ATSC 1.0." ATSC 3.0 defines an efficient and flexible physical layer which is designed around a core principal: to deliver Internet Protocol (IP) packets to the upper layers of the protocols stack in the receiver. IP-based protocols were chosen to be as aligned as possible with standards developed for the internet and world-wide web, especially considering that ATSC 3.0 also supports "over the top" (OTT), or broadband delivery, of signaling and content. Hybrid Services are also possible, in which some components of one television service are delivered via the broadcast path while others (for example interactive content or an alternative audio track) are delivered via broadband servers operated by the broadcaster.

ATSC 3.0 standardizes methods that allow the broadcaster to provide "interactive content" to the ATSC 3.0 receiver. While ATSC 3.0 Services typically include streaming video/audio/caption content—a traditional TV channel, in ATSC 3.0 they can have an additional interactive component that is coded as a broadcaster application (e.g., HTML5 application). When present, the broadcaster application can offer interactivity or can execute silently in the background to, for example, monitor usage patterns. However, broadcaster applications have limited functionality, whereas other applications present in the receiver have the ability to perform functions that the HTML5 type of broadcaster application cannot perform. Currently, there are no methods or mechanisms that allow other applications to take over for the broadcaster application.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to an embodiment of the present disclosure, there is provided a reception apparatus that includes a memory that stores a television receiver application and a native application. The reception apparatus further includes a processor configured to send, by the native application to the television receiver application, a query command regarding a number of services available for display. The processor is further configured to receive, by the native application from the television receiver application in response to the query command, a query response message including at least a first parameter that specifies a number of associated services available for display. The processor is further configured to provide, by the native application, a video surface for each service indicated in the first parameter.

According to an embodiment of the present disclosure, there is provided a reception apparatus that includes a memory comprising a native application and a television receiver application. The reception apparatus further includes receiver circuitry configured to receive a digital broadcast stream that includes television content and a broadcaster application. The reception apparatus further includes a processor configured to provide, by the television receiver application, a video surface to display the television content, execute the broadcaster application, and execute the native application that is identified by the broadcaster application. The native application is configured to perform a task in place of the broadcaster application, cause another broadcaster application to execute in place of the broadcaster application, or provide data not otherwise accessible to the broadcaster application.

According to an embodiment of the present disclosure, there is provided a non-transitory computer readable medium having instructions stored therein, which when executed by a processor in a reception apparatus causes the processor to execute a method that includes sending, by a native application to a television receiver application, a query command regarding a number of services available for display. The method further includes receiving, by the native application from the television receiver application in response to the query command, a query response message including at least a first parameter that specifies a number of associated services available for display. The method further includes providing, by the native application, a video surface for each service indicated in the first parameter.

Hold

According to an embodiment of the present disclosure, there is provided non-transitory computer readable medium having instructions stored therein, which when executed by a processor in a reception apparatus causes the processor to execute a method that includes receiving a digital broadcast stream that includes television content and a broadcaster application. The method further includes providing, by a television receiver application, a video surface to display the television content. The method further includes executing the broadcaster application. The method further includes executing a native application that is identified by the broadcaster application. The native application is configured to perform a task in place of the broadcaster application, cause another broadcaster application to execute in place of the broadcaster application, or provide data not otherwise accessible to the broadcaster application.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
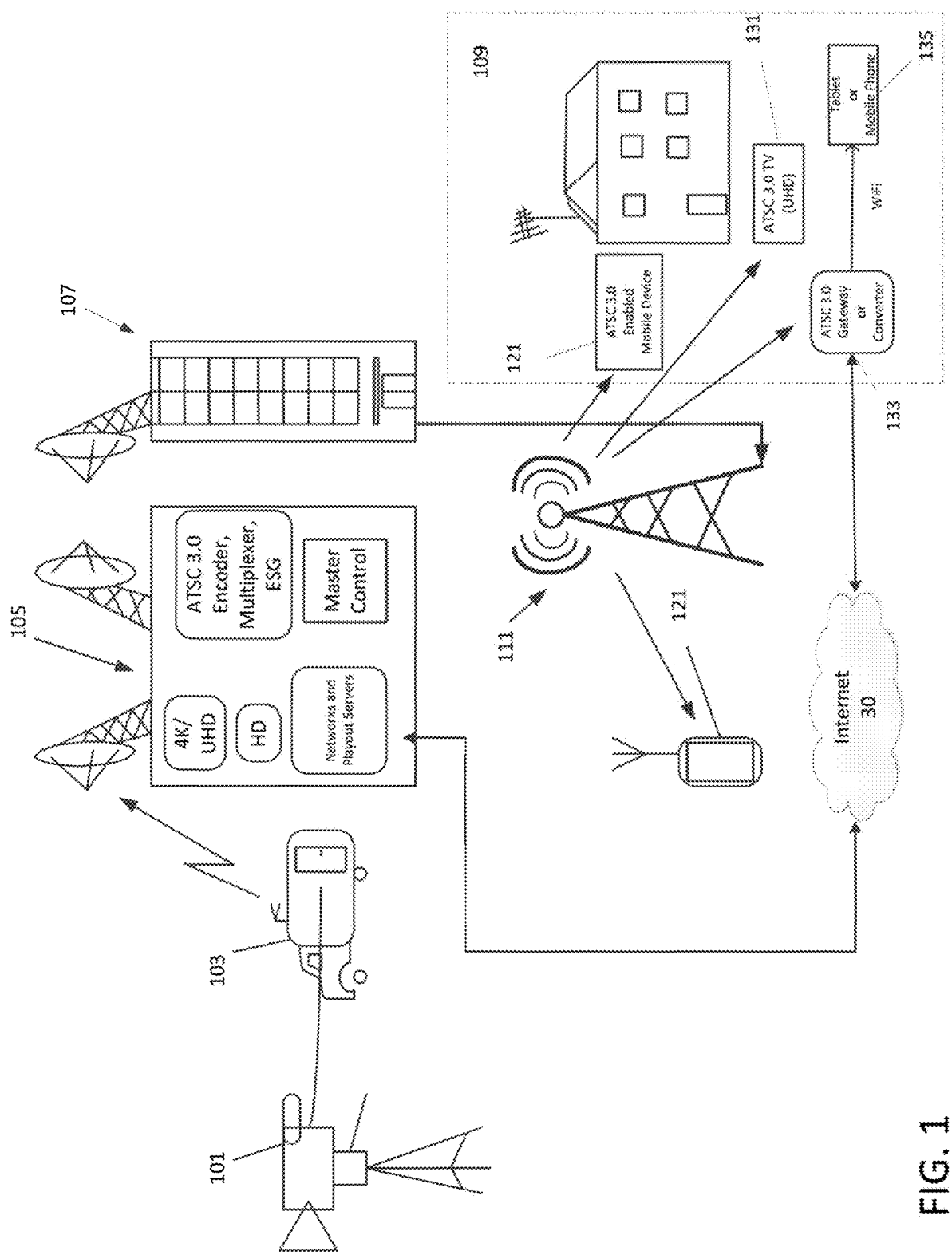
FIG. 1 is a schematic that shows basic components of a digital television (DTV) system.

Referring now to the drawings, wherein like reference numerals designate identical or corresponding parts throughout several views, the following description relates to native broadcaster applications that provide additional functionality over broadcaster applications. In one embodiment, a reception apparatus including an ATSC 3.0 tuner for receiving ATSC 3.0 signals is provided. In additional embodiments, an ATSC 3.0 Receiver for an Android device such as a smartphone, tablet, or other consumer electronic device (such as a set-top box) is provided that includes a dedicated Android app used in conjunction with a hardware add-on in the form of a Tuner/Demod module which is connected via Universal Serial Bus (USB).

The present disclosure provides many benefits over other models for providing audio/video and data content, by combining broadcast DTV with functions that are particular to an electronic device (e.g., mobile devices such as smartphones and tablet computers) to which DTV functionality can be added or provided by a television receiver application. The present disclosure provides an example that applies an ATSC 3.0 receiver to the widely available Android platform. The present disclosure provides portability across various hardware devices as the receiver is preferably coded in the Java programming language, and the ATSC 3.0 receiver may even be applied to hardware devices that are without built-in DTV circuitry and antenna as the receiver can include a separately provided USB-connected tuner. Embodiments of the present disclosure provide an ATSC 3.0 receiver that utilizes broadcaster application (e.g., HTML5 application) features to the fullest extent while extending to features of a hardware device that are not available in the environment of the broadcaster application (e.g., HTML5). For example, the disclosed receiver performing broadcaster application operations can hand off, or work together to provide, interactive functions to the broadcaster's native application (e.g., Android application).

Each of the functions of the described embodiments may be implemented by one or more processing circuits. A processing circuit includes a programmed processor. In described embodiments, the programmed processor is an ARM processor commonly found in Android-based smartphones and tablets that runs the Android operating system. The Android app may be an application program written in one or more high-level programming languages, such as C/C++ and Java, which utilize the Android operating system. A processing circuit may also include devices such as an application specific integrated circuit (ASIC) and conventional circuit components arranged to perform the recited functions. Note that circuitry refers to a circuit or system of circuits. Herein, the circuitry may be in one computer system or may be distributed throughout a network of computer systems.

One or more embodiments provide a model in which over-the-air programming and other services may be received as Internet data directly from a television broadcaster. In such case, broadcast DTV may be displayed in display services controlled by broadcaster's Android application in a manner that uses resources and services of the ATSC 3.0 receiver of the present disclosure.

In some embodiments, an ATSC 3.0 Service is a collection of media components and/or metadata delivered to receivers in aggregate. The components can be of multiple media types. A Service can be either continuous or intermittent. A Service can be Real Time or Non-Real Time. Real Time Service can consist of a sequence of TV Programs.

Next, a description is provided of a basic architecture of a broadcast television network based on ATSC 3.0.

FIG. 1 is a diagram showing an arrangement of basic components for an ATSC 3.0 system. Video technology is moving from High Definition (HD) digital television to higher resolution technologies, including 4K and 8K video, High Dynamic Range (HDR), wide color gamut, and high frame rate. Subsequently, the ATSC 3.0 system may include a digital video camera 101 that can capture Ultra High Definition (UHD) video, possibly remotely in conjunction with a mobile transmission unit 103 that provides a signal for a TV station 105. The TV station 105 includes, among other things, facilities for television production and broadcast control. Using ATSC 3.0, an encoder and multiplexer may generate IP packets for a television broadcast. The television broadcast may be transmitted with an Electronic Program Guide (EPG) to one or more transmitter sites 107. An ATSC 3.0 transmitter site may include an ATSC 3.0 waveform transmitter that transmits radio frequency (RF) signals via a tower transmit antenna 111. The ATSC 3.0 waveform may be picked up in a home, office building, library, shop or restaurant 109 by an ATSC 3.0 TV 131, an ATSC 3.0 Gateway or Converter 133, or an ATSC 3.0 enabled mobile device 121. A tablet or smartphone 135 may obtain the broadcast signal as a WiFi signal provided from the Gateway or Converter. Alternatively, outside a place of business or a home, Tablets, smartphones or other mobile devices 121 may pick up the broadcast waveform from a tower transmit antenna 111. Such mobile devices 121 may be used within a personal vehicle or within a mode of public transportation.

Mobile operating systems, such as the Android operating system developed by Google LLC, are operating systems for phones, tablets, smartwatches, or other mobile devices and include features for mobile or handheld use. For example, mobile devices may include mobile features of cellular communication, Global Positioning System (GPS) navigation, video or single frame cameras, speech recognition, and typically a touchscreen. Examples of other mobile operating systems include Apple's iOS, Windows 10 Mobile, and Samsung's Tizen. In particular, the Android operating system has been designed primarily for touchscreen devices. Typically, application software for the Android operating system runs on an application framework which includes a Java library based on Open JDK (Java Development Kit).

In the present disclosure, a DTV broadcaster, or simply broadcaster as used herein, relates to a local television station that transmits video content via radio waves as a terrestrial television transmission. A station that transmits radio signals as digital television signals may broadcast several sub-channels. For example, a DTV broadcaster may broadcast at channel 31.1, as well as sub-channels 31.2, 31.3, etc.

Figure 2:
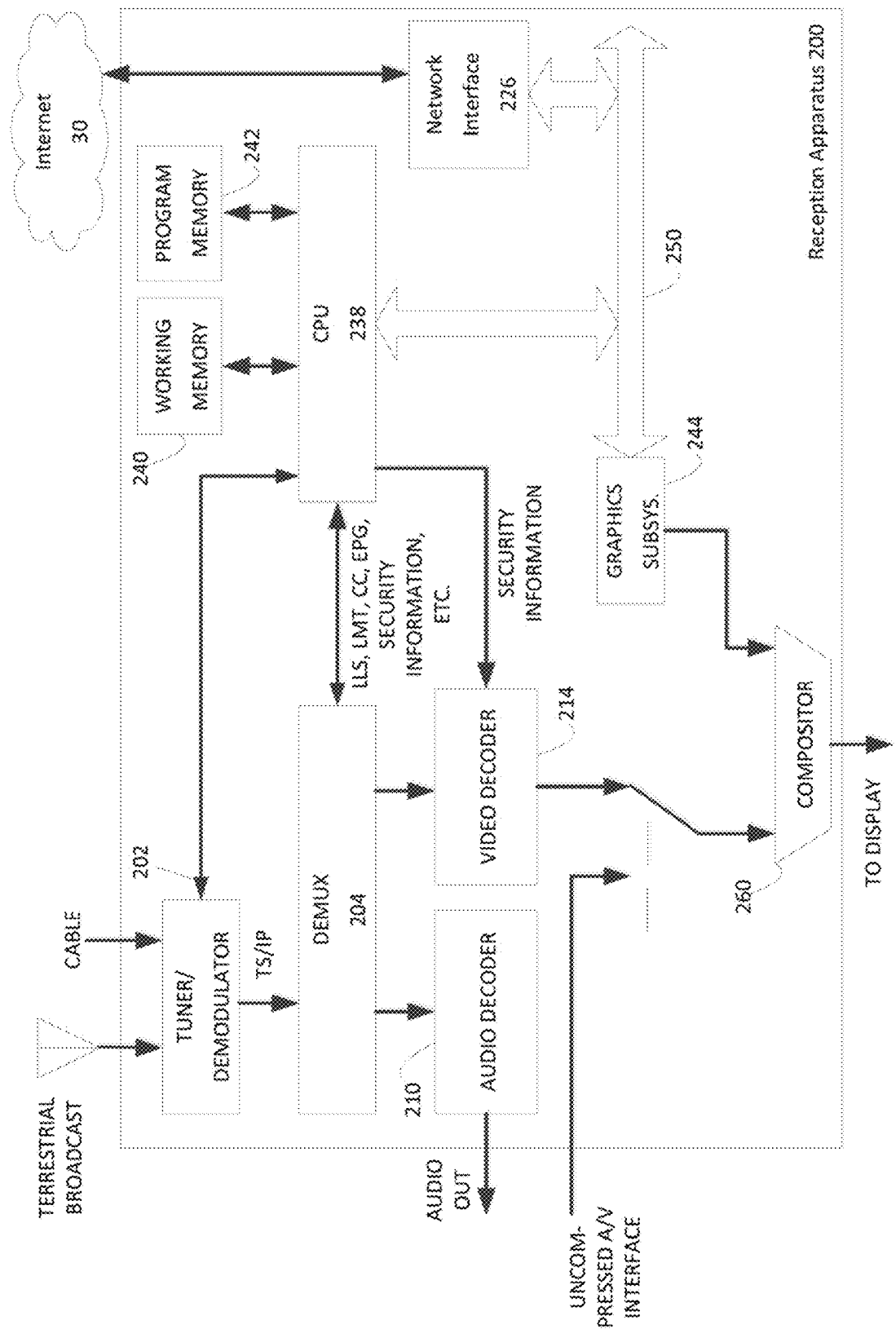
FIG. 2 illustrates an exemplary reception apparatus.

FIG. 2 illustrates an exemplary reception apparatus 200, which is configured to access television content and broadcaster applications. The reception apparatus 200 may be a fixed device such as a television set or a set top box. The reception apparatus may also be a mobile device such as a smartphone, tablet computer, laptop, portable computer, or any other device configured to receive television content. Further, the reception apparatus 200 may include a DTV receiver that is incorporated in, or otherwise connected to, a vehicle or any of the fixed or mobile devices described above.

The reception apparatus 200 includes receiver circuitry that is configured to receive a data stream (e.g., a broadcast stream) from one or more service providers 102 and processing circuitry that is configured to perform various functions of the reception apparatus 200. In one embodiment, a tuner/demodulator 202 receives broadcast emissions containing the broadcast stream. Depending on the embodiment, the reception apparatus 200 may alternatively or additionally be configured to receive a cable television transmission or a satellite broadcast. The tuner/demodulator 202 receives the data stream which may be demultiplexed by the demultiplexer 204 or handled by middleware and separated into audio and video (A/V) streams. Although FIG. 2 depicts that the tuner/demodulator is included in the reception apparatus, in other embodiments, the tuner/demodulator 202 is an external hardware device that connects to the reception apparatus via a universal serial bus (USB) port. The audio is decoded by an audio decoder 210 and the video is decoded by a video decoder 214. Further, uncompressed A/V data may be received via an uncompressed A/V interface (e.g., a HDMI interface), if available.

The reception apparatus 200 generally operates under control of at least one processor, such as the CPU 238, which is coupled to a working memory 240, program memory 242, and a graphics subsystem 244 via one or more buses (e.g., bus 250). The graphics outputted by the graphics subsystem 244 are combined with video images by the compositor and video interface 260 to produce an output suitable for display on a video display. The demux 204 and CPU 238 may transfer between each other low level signaling (LLS) tables such as a service list table (SLT), link-layer tables such as link mapping table (LMT), closed caption (CC) data, EPG data, security information, or any other data used for providing and accessing ATSC 3.0 services.

The CPU 238 operates to carry out functions of the reception apparatus 200 including executing script objects (control objects) contained in a broadcaster application (e.g., HTML5 application) using for example an HTML5 User Agent stored in the program memory 242, and other types of broadcaster applications such as one or more native broadcaster applications. Here, HTML5 refers to content consisting of HTML markup, JavaScript, graphics, presentable media, and CSS as specified in ATSC Standard A/344—ATSC 3.0 Interactive Content, dated Dec. 18, 2017, herein incorporated by reference in its entirety (hereinafter "ATSC A/344"). Furthermore, a broadcaster application can incorporate the functionality embodied in a collection of files comprised of an HTML5 document, known as the Entry Page and other HTML5, CSS, JavaScript, image and multimedia resources referenced directly or indirectly by that document, all provided by a broadcaster in an ATSC 3.0 service.

In one embodiment, the collection of files making up the broadcaster application can be delivered over broadcast as packages, via the ROUTE protocol described in ATSC Standard A/331—Signaling, Delivery, Synchronization, and Error Protection, dated Dec. 6, 2017, for example, and incorporated by reference in its entirety. An exemplary broadcaster application framework is described in the A/344 Standard.

The CPU 238 may be coupled to any one or a combination of the reception apparatus 200 resources to centralize control of one or more functions, in certain embodiments. In one embodiment, the CPU 238 also operates to oversee control of the reception apparatus 200 including the tuner/demodulator 202 and other television resources.

Figure 3:
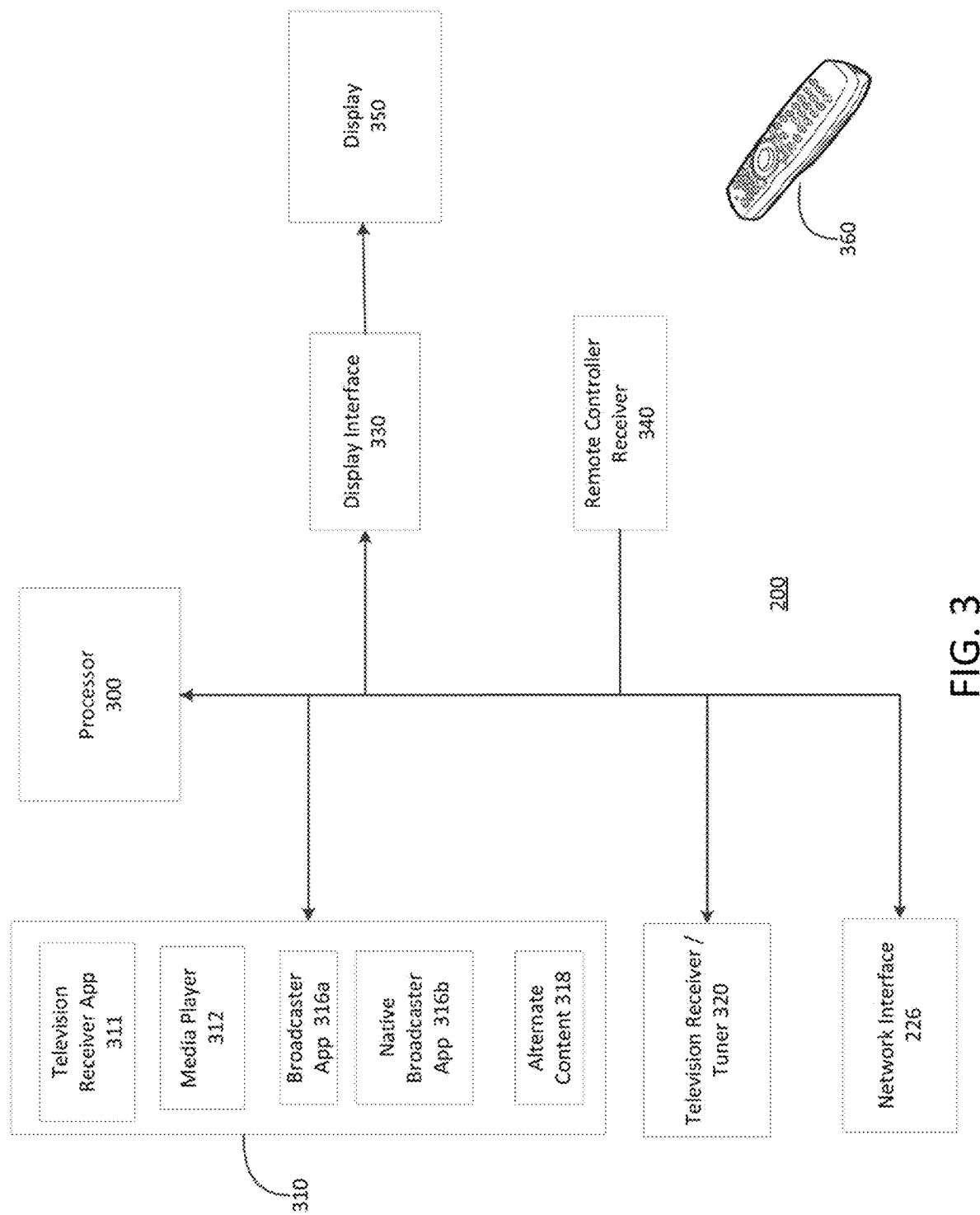
FIG. 3 is a processor-centric block diagram of an exemplary reception apparatus.

A more processor-centric view of the reception apparatus 200 is illustrated in FIG. 3. Memory 240 and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 200 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 200 as in a television set or a connected display device as in the case where the reception apparatus 200 is integrated into a set-top box.

Memory 310 contains various functional program modules and data. The memory 310 stores the data used by the reception apparatus 200. The memory 310 within the reception apparatus 200 can be implemented using disc storage form as well as other forms of storage such as non-transitory storage devices including, for example, network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

The memory 310 includes a television receiver application 311 (e.g., an ATSC 3.0 Receiver Application) that enables watching television content. Both a broadcaster application 316a and a native broadcaster application 316b are stored in the memory 310. The broadcaster application 316a may be an HTML5 application that is included in a broadcast stream. The native broadcaster application 316b may either be provided with the reception apparatus 200 or installed at a later time (e.g., downloaded from an App store). The broadcaster application 316a and native broadcaster 316b are executed by the processor 300. Further, these applications may cause the processor 300 to control the reception apparatus 200 to acquire alternate content 318, which is stored in the memory 310 for subsequent retrieval. In another embodiment, the processor 300 causes the reception apparatus 200 to retrieve or stream the alternate content 318 at the time of presentation.

In some embodiments, an ATSC 3.0 Service can be defined to be only an interactive broadcaster application without live streaming video. Such a Service would offer access to the OTT content, or it could be an electronic program guide, or any other information of interest. A particularly useful Service is a broadcaster application such as a HTML5 web application that provides information about recent or ongoing Emergency Alerts. However, broadcaster application such as HTML5 web applications are inherently limited by the HTML5 environment itself.

While the ATSC 3.0 standard defines new APIs that allow the broadcaster's application to perform certain TV-related functions (such as Service selection), certain functionality defined in the standard is not available for broadcaster applications. Embodiments of the present disclosure are directed to a native broadcaster application that can access hardware and device specific functions that broadcaster applications, such as HTML5 web applications, cannot access. In one embodiment, the native broadcaster application is an application available from an App store that is downloaded for execution on an Android operating system. As understood by one of ordinary skill in the art, the Android operating system is provided for purposes of explanation and that the present disclosure can include any operating system known to one of ordinary skill in the art such as iOS, MAC OS, Windows, Linux, or Tizen.

A broadcaster application such as a HTML5 web application has limitations that a native broadcaster application (e.g., Android app) may not have. For example, due to stricter security of the environment, the HTML5 web application may not have the ability to access certain higher-value content, such as 4K High Dynamic Range (HDR). HTML5 web applications cannot access Android graphics primitives for drawing. HTML5 web applications do not have an ability to use touch screen gestures in a tablet or smartphone environment. HTML5 web applications do not have an ability to access Android-supplied and device-specific features such as geolocation, keychain, photo library, accelerometers, and a device camera. In some instances HTML5 web applications do not have an ability to add pay-to-use functionality or access to e-commerce. HTML5 web applications do not have guaranteed access to local memory resources. HTML5 web applications do not have access to accounts established by the user in the Android device. HTML5 web applications are not able to provide linkage to other applications such as e-mail, messaging, or Facebook. HTML5 web applications do not have access to local user preferences. Unlike native applications, HTML5 web applications cannot request and receive permission to notify the user when certain events occur. Thus, embodiments of the present disclosure provide a native broadcaster application that operates in conjunction with a broadcaster application (e.g., HTML5 web application) that may be obtained via a broadcaster's Service. Basic components of a native broadcaster application, using the Android operating system as an example, are described next.

Figure 4:
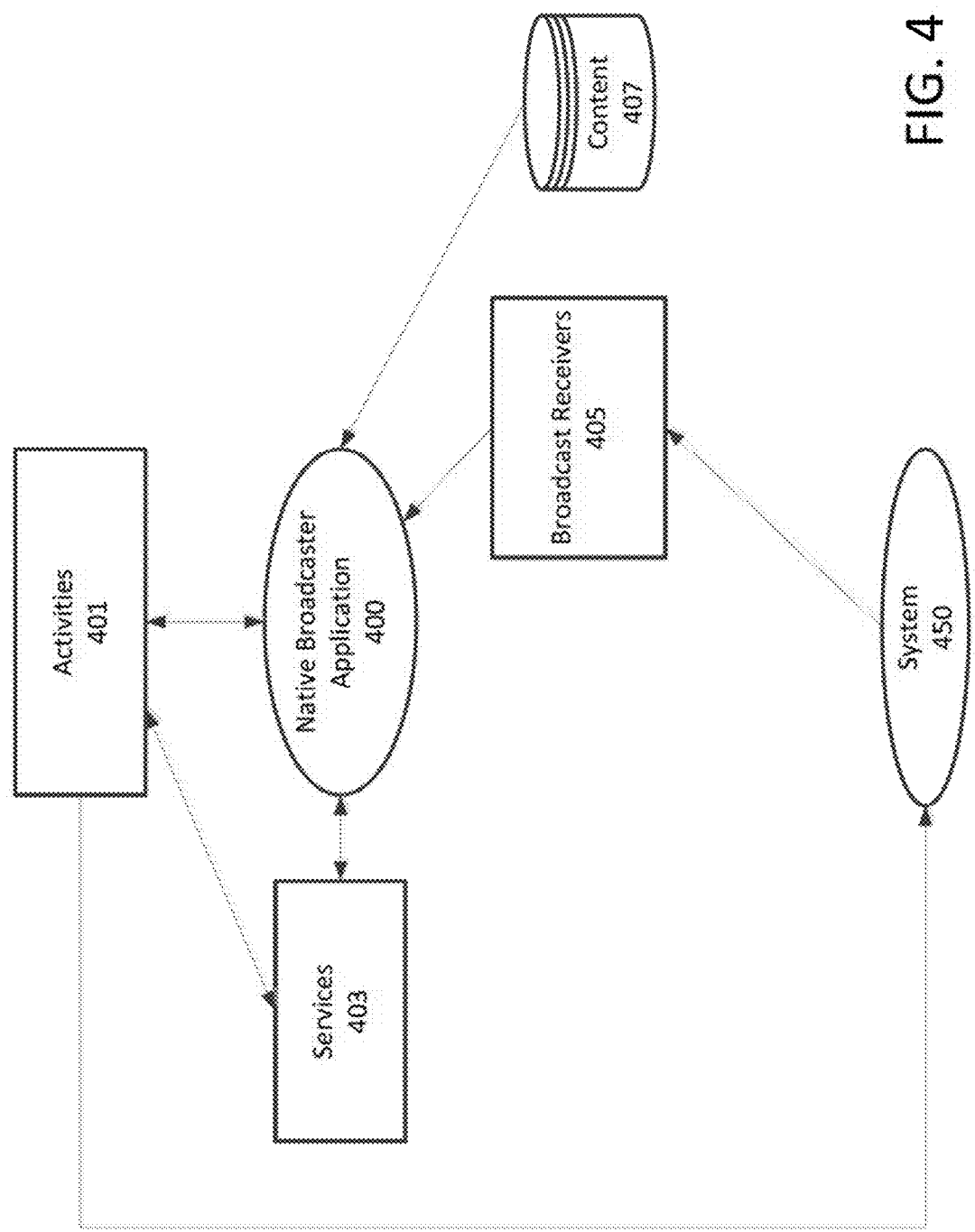
FIG. 4 is a schematic that shows a basic architecture of a native broadcaster application.

FIG. 4 is a diagram of the basic architecture of a native broadcaster application 400 for an operating system platform such as the Android platform. For example, native broadcaster applications on the Android platform may be built from among four types of components: activities 401, services 403, "broadcast" receivers 405, and content providers 407. In the context of the Android platform, the term "broadcast" refers to information available to applications running on the Android platform/device, rather than the concept of terrestrial television broadcast. In some embodiments, the native broadcaster application 400 may be an application that is downloaded from an App store to a device such as a reception apparatus that already includes ATSC 3.0 capabilities, or a user's Android device such as smartphone or tablet.

Activities 401 are the entry points for user interaction, representing a single screen with a user interface. An activity 401 may communicate to the system 450 information necessary to ensure proper operation of the native broadcaster application 400. An activity 401 may be responsible for: (i) keeping track of what the user is currently using so that the operating system (e.g., Android OS) can keep the associated processes running; (ii) keeping track of activities the user may be interested in but are currently stopped so that the operating system may prioritize keeping the associated processes around; (iii) helping the native broadcaster application 400 maintain a record of the application's state so that the user can return to activities where they left off if the native broadcaster application 400 is stopped or terminated; (iv) providing a way for the native broadcaster application 400 to implement information flows between itself and other apps.

A service 403 is a component that may run in the background to perform ongoing operations for the native broadcaster application 400. The service 403 may be an entry point generally used to keep the native broadcaster application 400 running in the background. Services 403 may also perform work for remote processes. A service 403 does not provide a user interface. Other components, such as an activity 401, can start a service 403 and let it run, or can bind to it to interact with it. Some services 403, such as music playback, involve something the user is aware of and thus, would like to keep running. Other services may run silently, where the user does not notice these silent services being terminated (e.g., to free up memory) by the OS.

Services 403 may be bound to a native broadcaster application 400 that has indicated it wishes to make use of that service 403. The OS may utilize this information regarding the dependency between the native broadcaster application 400 and service 403 to manage processes associated with the native broadcaster application 400 and the service 403.

The broadcast receiver 405 component may enable the system 450 to deliver events to the native broadcaster application 400 on a system-wide basis (e.g., outside of the regular user interaction with the native broadcaster application 400). An example system-wide notification is one announcing that the battery level is low or that a picture has been captured from the camera.

A content provider 407 may manage a shared set of application data that can be stored in the Android file system, in a database, on the web, or on any other accessible persistent storage location. Other applications can query or modify the data if the content provider 407 allows these types of modifications.

Figure 5:
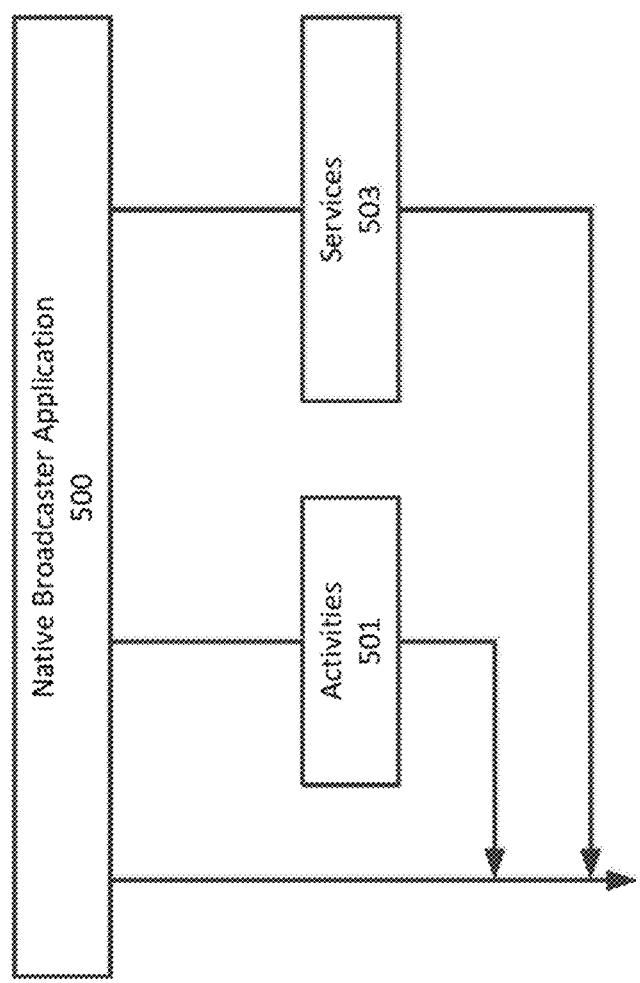
FIG. 5 is a block diagram for a television receiver application in accordance with an exemplary aspect of the present disclosure.

FIG. 5 is a diagram illustrating the relationship between a native broadcaster application 500 and associated activities and services. As shown in FIG. 5, the native broadcaster application 500 may or may not have activities 501 (with user interfaces) associated with them. A native broadcaster application 500 may or may not have services 503 (or broadcast receivers, or content providers) associated with them. Activities 501 generally involve a user interface (e.g., displaying something visible, or accepting some user input such as a keypress or gesture).

Embodiments of the present disclosure provide a television receiver application for ATSC 3.0 Services. In some embodiments, the television receiver application is a native Android application implemented within a DTV receiver that has been built on top of the Android OS. The television receiver application may be launched automatically when the receiver is switched on, and may operate in the background even when not displaying anything visible to the user. The television receiver application may be written in a high-level programming language such as C/C++ and compiled for the hardware environment of the television, or it may be written in the Java programming language for better portability to other hardware running the Android operating system (such as tablets, phones, or set-top boxes).

Figure 6:
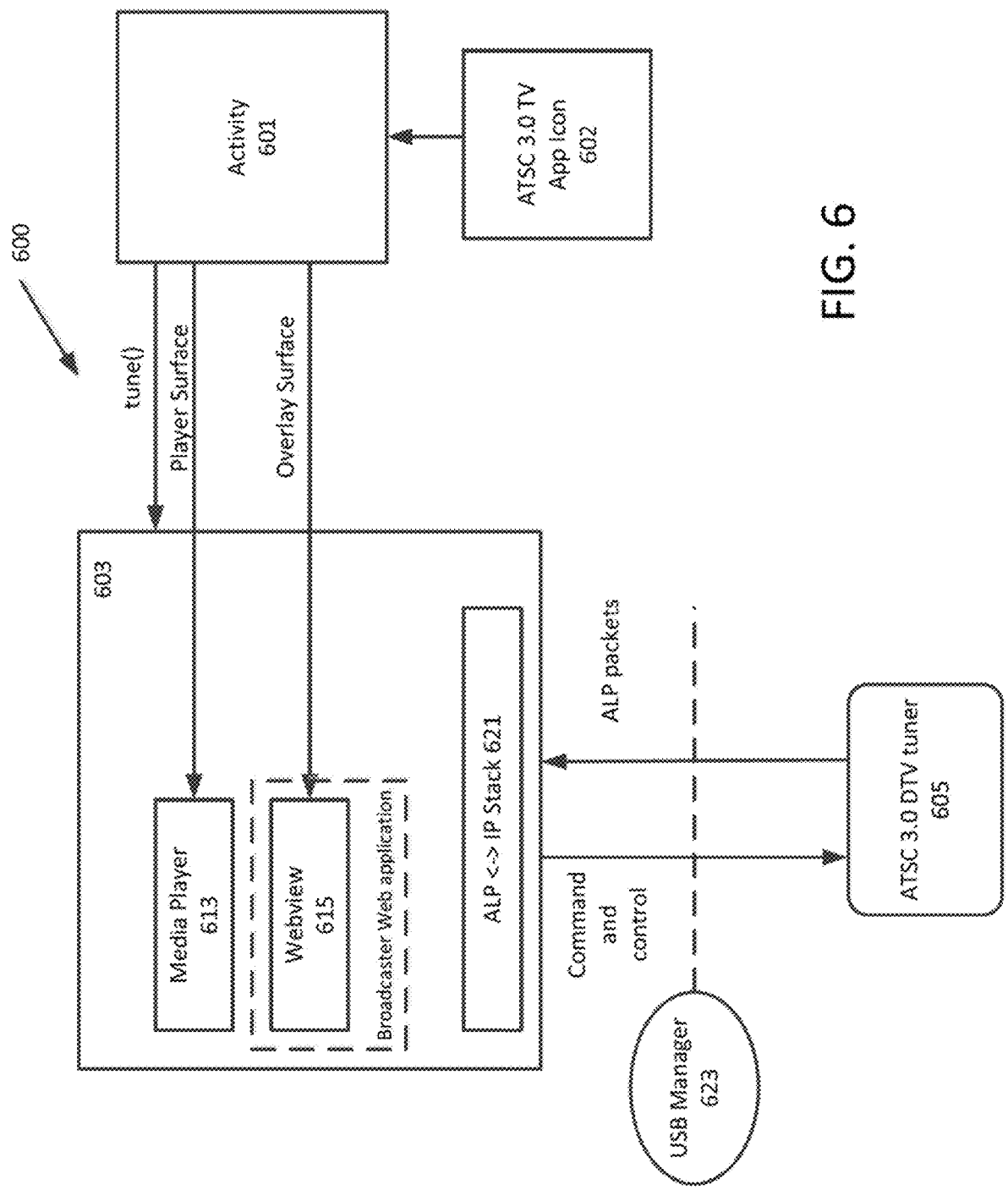
FIG. 6 is a block diagram for an example broadcaster receiver application.

FIG. 6 is a block diagram of an embodiment of an ATSC 3.0 DTV receiver 600. The television receiver application 603 includes an associated activity component 601. When the user activates the ATSC 3.0 TV function in the receiver, by selecting the "TV" input or by selecting the "ATSC 3.0 TV" icon 602 from an app tray, the activity component 601 is launched. By that time, the television receiver application 603 is already running, and would have collected IP packets from whatever RF channel had been tuned by the Tuner 605. The television receiver application may have already been able to begin retrieving audio, video, and caption packets from the broadcast and have sent them to its media player 613 (e.g., ExoPlayer) for decoding and rendering. Media player 613 may be an application level media player for Android. Media player 613 may be configured to support, for example, Dynamic Adaptive Streaming over HTTP (DASH) and Common Encryption.

The activity component 601 can accept user input from the Remote Control Unit (RCU), to (for example) support channel change or selection. The "tune( )" function in the figure reflects this operation. In some embodiments, the activity component 601 may create two viewing surfaces that give the user a view of the video associated with the Service (e.g., the "Player Surface") and any overlays that the broadcaster application (e.g., HTML5 web application) may produce (e.g., the "Overlay Surface"). The player surface may be handled by the media player 613, while the Overlay Surface may be handled by Webview 615.

In FIG. 6, the tuner 605 is a hardware device in the ATSC 3.0 DTV receiver 600 that can tune to and demodulate an ATSC 3.0 broadcast signal, and produce a sequence of ATSC 3.0 Link layer Protocol (ALP) packets which it streams to an ALP to IP converter 621. In some embodiments, the receiver 600 is an electronic device (e.g., smartphone, tablet, laptop, television, etc.) having USB port to which the Tuner 605 connects to provide additional tuner functionality. The USB connection may be USB 2.0 or USB 3.0. USB 2.0 is used in some embodiments to ensure greater compatibility with existing electronic devices. Upon being launched, the television receiver application may use a UsbManager Android Class 623.

The television receiver application 603 may provide functionality allowing the rendering and display of broadcast, OTT, and streaming video, as well as audio and closed captioning data. Furthermore, the television receiver application 603 may support a "runtime environment" through which broadcaster applications (e.g., HTML5 applications) may be executed. In addition to functionality supported by standard web browsers, additional functionality may be incorporated by means of a Web Sockets protocol. The Web Sockets APIs specified in the A/344 Standard add support for capabilities including access to tuning functions, memory management, interaction between the broadcaster application and the receiver's Media Player (RMP), among many others.

In some embodiments, the broadcaster application (e.g., HTML5 web application) is provided by a broadcaster as an adjunct to a regular streaming broadcast television service to provide interactivity or to operate in the background, for example, to monitor the user's usage of the service. Furthermore, the broadcaster may define a type of Service that is presented as the output of the broadcaster application that is associated with that Service. Such Services may not be offered by an ATSC 3.0 receiver that does not support the A/344 Standard interactive content specification.

Figure 7B:
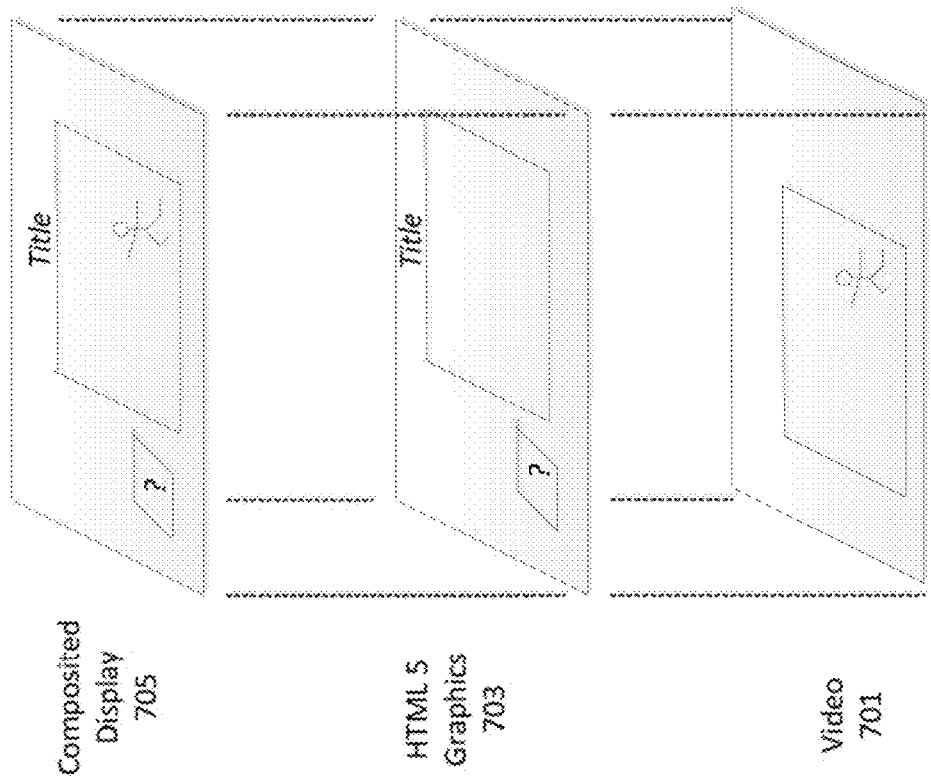
FIGS. 7a and 7b illustrate an example broadcaster application rendered using a receiver's Media Player.
Figure 7A:
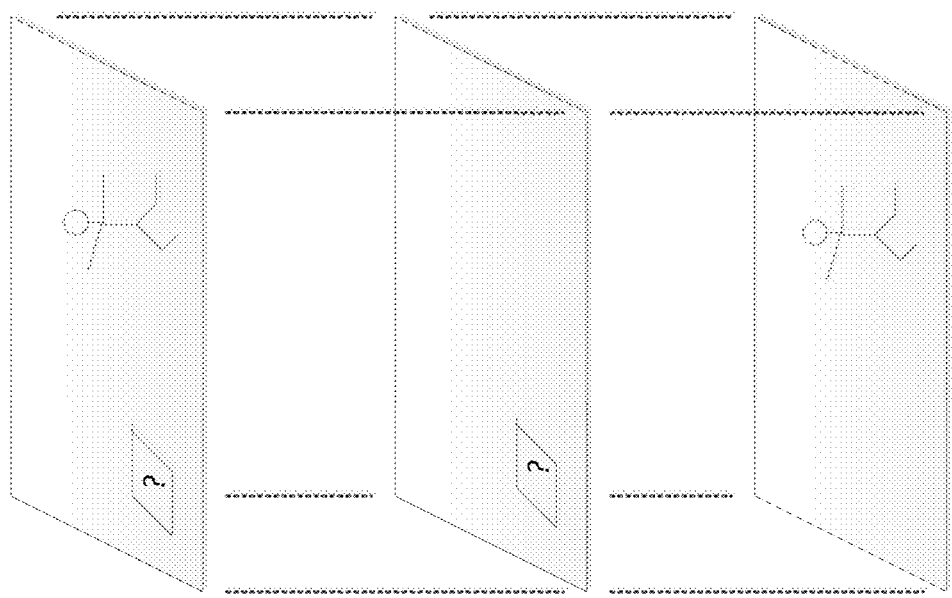

FIGS. 7a and 7b illustrate an embodiment of a broadcaster application rendered using a receiver's Media Player. A video 701 may be displayed over the whole Media Player window as in FIG. 7a, or a video 701 may be scaled and positioned in a reduced portion of the Media Player window as in FIG. 7b. The broadcaster application may generate a graphic display 703, for example using HTML5, that can map to the entire Media Player window as in FIG. 7a, or a graphic display that includes an embedded background window that is the position and dimensions of the Media Player window as in FIG. 7b. In each case, the broadcaster application may form a composited display 705.

Figure 8:
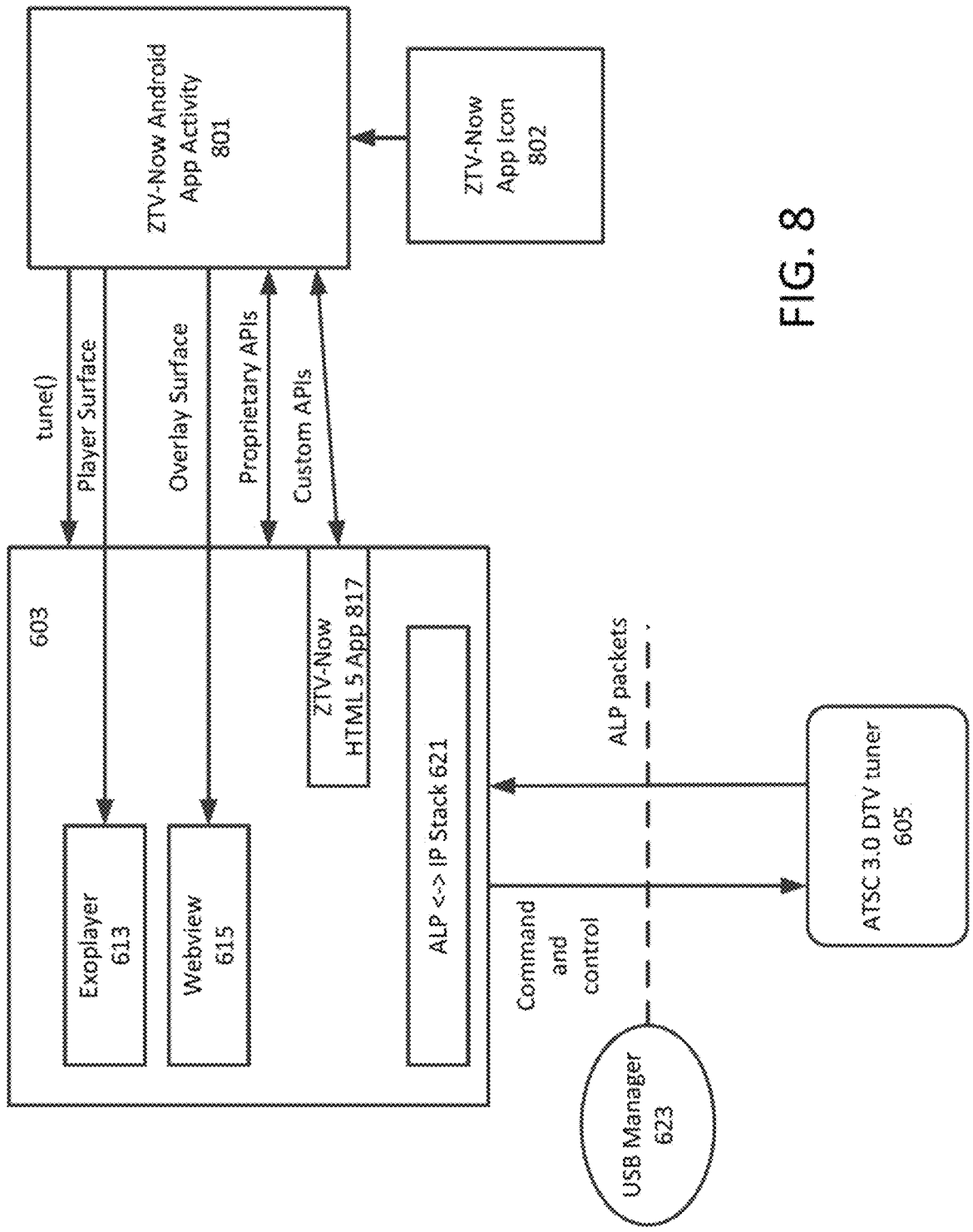
FIG. 8 illustrates an example broadcaster activity interface.

FIG. 8 illustrates an example native broadcaster Android application developed by a particular broadcaster. In this example, the broadcaster is named ZTV and the broadcaster's native broadcaster application is called "ZTV-now." While a broadcaster application may be downloaded and executed within the television receiver application along with the broadcaster's content, a native broadcaster application exists within the DTV receiver after having been downloaded and installed by the user (e.g., Android app downloaded and installed from Play Store). In another example, the native broadcaster application may be pre-installed by the manufacturer of the DTV receiver. A native broadcaster application has a more persistent presence in the DTV receiver than the broadcaster application, as a broadcaster application may be deleted by the receiver when the user changes to a different television Service.

In some embodiments, the native broadcaster application may be launched by activating an icon representing the native broadcaster application that appears in the application tray, for example, alongside icons for ATSC 3.0 TV, Netflix, PrimeVideo, etc. The native broadcaster application is launched if the user clicks on this icon. In some embodiments, the native broadcaster application may be launched automatically by a broadcaster application (e.g., HTML5 web application) distributed with one of that broadcaster's ATSC 3.0 Services.

The television receiver application 603 may be running in the background even when no activity has created any user interaction or display surface. In this example, the television receiver application is tuned to a ZTV ATSC 3.0 television Service, and that Service provides a broadcaster application (e.g., ZTV-Now HTML5 App 817) as an adjunct. The broadcaster application can create a user experience as it uses, for example, WebView 615 to interpret HTML5.

With reference to FIG. 8, a ZTV native broadcaster application called "ZTV-Now" is present, supplying an activity 801 that allows the user to interact with it once it is launched and takes display priority in the system. The ZTV-Now app can be launched in one of two ways. The user may find a ZTV-Now app icon 802 in the app tray (alongside other app choices such as Netflix, Prime Video, HBO Go, etc.) and choose to launch it. Alternatively, the ZTV-Now application may be launched by the ZTV broadcaster application using a custom API, for example as agreed between the DTV manufacturer and the broadcaster (ZTV). The custom APIs may include additional functionality and information sharing between the broadcaster application and native broadcaster application, as described below.

The native broadcaster application, after it takes control, can create a user experience by providing one or more surfaces upon which to render text, graphics, or video. A video surface can be created, and connected to video or images produced by the television receiver application 603, or the full-screen video and audio content being rendered by the television receiver application 603 can be displayed on a surface under the control of the native broadcaster application. In addition, an overlay surface may be provided by the native broadcaster application in which text and graphics are overlaid on the video surface.

An example implementation of the ZTV-Now native broadcaster application is for it to organize a presentation of the possible sources of ZTV television content, both live (broadcast streaming via the Tuner) and over-the-top (broadband-delivered) content. The user may be presented with thumbnail views of the available content, which could include live video received through the television receiver application, when the tuner 605 happens to be, or is, tuned to an ATSC 3.0 broadcast channel carrying ZTV television services. The user may navigate among the different ZTV offerings, and upon making a choice of one or another, the native broadcaster application could begin rendering the chosen content full-screen.

The offered OTT content may be video-on-demand (VOD) content delivered through the DTV's internet connection, affording the user an opportunity to view episodes of programs not currently airing. Further, the available OTT content could include titles that require the user to establish an account with ZTV and to pay for the right to view (or rent, for a period of time) the desired programming. Movie studios may make certain high-value content (such as 4K HDR versions of content) available only on a pay-per-view basis for security reasons, as in some cases content broadcast over the air may be easily copied and pirated.

The proprietary APIs shown in FIG. 8 are designed, in some embodiments, to support the environment in which the native broadcaster application is present in a DTV receiver implemented via the television receiver application.

In some embodiments, an API allows the native broadcaster application to determine, by querying the television receiver application, which, if any, ATSC 3.0 Services of interest to it are available for immediate rendering. If the tuner 605 has accessed an ATSC 3.0 broadcast emission carrying one or more Services associated with the broadcaster that has supplied the native broadcaster application, the native broadcaster application may then request the television receiver application to allow it to display video from those services, as thumbnail views or as full-screen (ordinary TV) viewing.

In some embodiments, the API allows the native broadcaster application to request the television receiver application to tune to and select a given ATSC 3.0 Service associated with the broadcaster.

In some embodiments, the API lets the native broadcaster application determine what format the thumbnail views of the available Services can be provided in. There are several possible ways the thumbnail views may be rendered, as described below.

In some embodiments, the API allows the native broadcaster application to cause the broadcaster application to discontinue any visible operation (e.g., presentation of text/graphics) so that the native broadcaster application can take over those responsibilities itself. In one scenario, the broadcaster application may assign or may perform tasks for the native broadcaster application to perform. For example, if the broadcaster application needs information or access to a function that is not accessible to the broadcaster application but is accessible to the native application, the broadcaster may identify the required information or function to be performed by the broadcaster application. In one embodiment, the broadcast application may provide a unique identifier (e.g., a content identifier) which the native application uses to determine a function to be performed or information to be retrieved. For example, if the broadcaster desires access to a user's subscriber account, since broadcaster applications generally do not have access to this type of information, the broadcaster application may send a command, or other indication, to the native broadcaster application that causes the native broadcaster application to retrieve and provide to the broadcaster application the appropriate information from the user's subscriber account. In this scenario, the broadcaster application may perform other tasks while the native broadcaster application is executing another task.

In another scenario, when it is determined that the native broadcaster application should take over for the broadcaster application, the broadcaster application may be moved from an active state to a suspend, or passive, state. In this example, the broadcaster application may not perform any tasks while the native broadcaster application is executing one or more tasks that the native broadcaster application could have performed by itself. Furthermore, the API may allow the native broadcaster application to instruct the broadcaster application to continue operation to let the user interact with the Service via the broadcaster application. When the broadcaster application receives an instruction from the native broadcaster application via the API, the broadcaster application may be moved from the suspend, or passive, state back to the active state.

In some embodiments, the API allows the native broadcaster application to communicate any arbitrary data to or from the broadcaster application. The API may not have knowledge of the content and format of the data passed between the native broadcaster application and broadcaster application, but rather provides the communication pathway between these applications. Since both the native broadcaster application and the broadcaster application may be developed and deployed by the same broadcaster, the broadcaster has the flexibility to design the data structures the broadcaster desires to use for this communication. An example implementation of this communication pathway in the Android environment involves use of the Android Parcel Class mechanism. The object data contained within a Parcel object may be formatted, for example, as a JSON (JavaScript Object Notation).

In some embodiments, the API allows the native broadcaster application to load a different (e.g., replacement) broadcaster application and cause the television receiver application to use the different broadcaster application in place of the one downloaded with the broadcast content. The API may provide a URL to the television receiver application that should be used to retrieve the different broadcaster application. The different broadcaster application could be better suited to perform functions in cooperation with the native application whereas the original broadcaster application is better suited to function alone.

In some embodiments, the API provides seamless switchover when the broadcaster application is replaced by the native broadcaster application. For example, when the native broadcaster application takes over operation of the broadcaster application, the user does not see any change in any existing user interface or displayed Service.

The availability of a bidirectional communication interface between native broadcaster application and broadcaster application offers a great deal of flexibility in the handling of various operations the broadcaster would like to have performed. As one example, a broadcaster application by itself can perform personalized ad replacement via the XLink-based methods and Web Socket APIs described and defined in the A/344 Standard. If a native broadcaster application is available, the broadcaster application can continue performing the ad replacements, however it could pass each XLink it receives for resolution (e.g., assigned task) over to the native broadcaster application. The native broadcaster application could use different logic to resolve information received from the broadcaster application. For example, the native broadcaster application may resolve the information received from the broadcaster application differently or more appropriately than could the broadcaster application, since the native broadcaster application may have access to more personal information (e.g., geolocation, user preferences, etc.) about this user than the broadcaster application does.

In one embodiment, an interface (e.g., API) between the television receiver application and native broadcaster application may be provided such that: (i) information about DTV Services are available for selection or rendering; (ii) the native broadcaster application can render thumbnail views of the available Services; (iii) a general-purpose communication path is available that the broadcaster can use to communicate between the broadcaster application and the native broadcaster application; (iv) the broadcaster application has the ability to query the ATSC 3.0 receiver regarding the presence of a specific native broadcaster application; and (v) the broadcaster application has the ability to cause a specific native broadcaster application to be launched.

Figure 9:
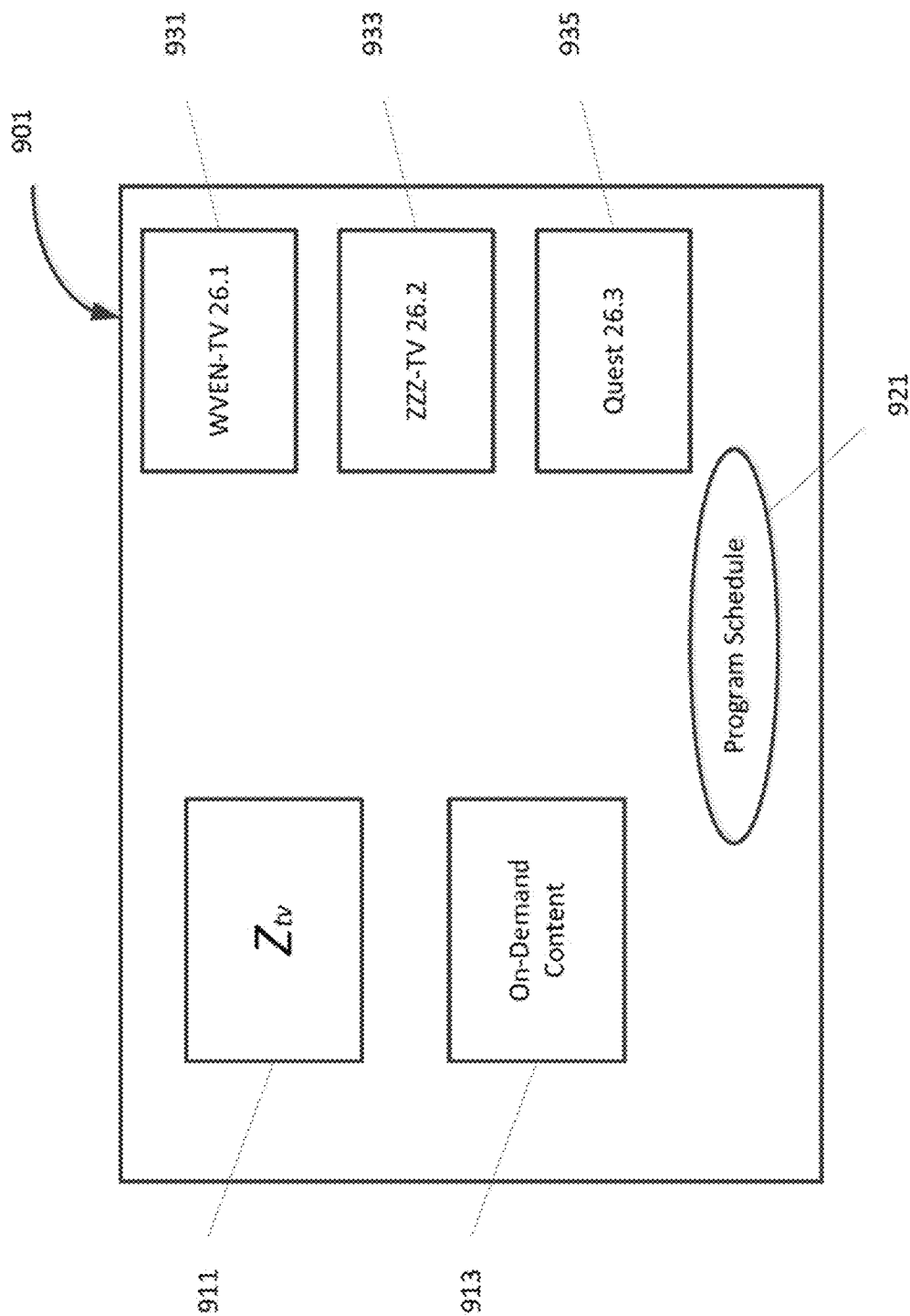
FIG. 9 illustrates an example user interface for a native broadcaster application in accordance with an exemplary aspect of the disclosure.

In some embodiments, the broadcaster's native broadcaster application has the ability to render live video in thumbnail format from multiple Services available to the DTV receiver, at frame rates up to full frame rate (e.g., no dropped frames), within rectangular windows of a size and position that the native broadcaster application specifies. FIG. 9 illustrates an example user interface for a native broadcaster application displaying thumbnail images. In this example native broadcaster application, the user interface 901 for ZTV offers the user thumbnail views of three ZTV broadcast services currently available from the television receiver application, one for each of the three sub-channels of WVEN-TV 931, 933, 935, which are displayed upon selection of the ZTV icon 911. As understood by one of ordinary skill in the art, FIG. 9 is only an example, and much more information can be provided, for instance the current time of day, the name of each of the current programs shown as thumbnails, a synopsis of each of the programs available on the three stations, banners with news bulletins, etc.

If the user selects "on-Demand Content" 913, a new full-screen interactive screen may be displayed with text and images depicting on-demand titles available to be streamed. If the user selects "Program Schedule" 921, a full-screen program guide could be displayed, showing current and future programming available on the ZTV broadcast stations.

The video displayed within each of the thumbnails may be enabled through the help of the television receiver application, which in the background may be collecting signaling and compressed streaming audio/video/caption data from each of these sub-channels.

In some embodiments, the thumbnail video images that can be displayed by the native broadcaster application may be communicated from the television receiver application to the native broadcaster application and formatted in one of several ways.

In some embodiments, thumbnail video images may be formatted as a sequence of JPEG images. For example, the television receiver application may provide (via the API) a URL resolved to a server local to the receiver itself. The native broadcaster application may fetch video images from this URL for display as the thumbnail. The television receiver application may continuously update the image, replacing the file with a new one whenever another video access point (e.g. "I frame") is encountered in the video stream. While the URL points to one JPEG file (which might be named, for example "frame.jpg"), by means of a sequence number included in the HTTP header info, the native broadcaster application can determine if the available image represents a new frame. Alternatively, the native broadcaster application can make a request for the file, and if a new frame is not available, the native broadcaster application can hold off responding with the requested JPEG until the new frame becomes available.

In some embodiments, thumbnail video images may be in DASH format, served locally by the television receiver application. For example, via the proprietary API, the television receiver application can provide the native broadcaster application with the URL of a DASH server, which may be located within the receiver itself (for example in a directory below localhost). When such a URL is supplied, the native broadcaster application may first request the name of a DASH Media Presentation Description (MPD) file and use that to determine the names of the initialization files for each media component (video, audio, captions) and determine the filename of the next available DASH Media Segment for each component type. The MPEG DASH standard is disclosed in ISO/IEC 23009-1:2014 "Information technology—Dynamic adaptive streaming over HTTP (DASH)—Part 1: Media presentation description and segment formats," dated May 2014, the entire contents of which are incorporated herein by reference. The live streaming video content may then be rendered by the native broadcaster application at full frame rate.

In some embodiments, thumbnail video images may be rendered within the television receiver application and made available to be displayed in a surface supplied by the native broadcaster application. As another example, the television receiver application may be designed such that it renders video content available from all Services that it can access within a given ATSC 3.0 broadcast emission. The Service selected by a user may be rendered full-screen and full-frame rate by a hardware decoder in the DTV receiver connected to the media player. Audio associated with this Service may also be decoded and output. Other Services (not the one selected for main viewing) may be decoded in software and rendered into display buffers that may or may not be associated with a visible display surface. Via the proprietary API, the native broadcaster application may attach any of these display buffers to a surface created by the native broadcaster application for display.

In some embodiments, the API may let the native broadcaster application know the number of associated Services available for display and the format that can be used by the native broadcaster application to access and display them.

The DTV receiver itself may make use of some of these capabilities of the television receiver application. As an example, the DTV receiver may offer "picture in picture" (PiP) functionality to let the user easily bounce back and forth among a multitude of Services available on the tuned 6 MHz broadcast channel. Instead of a PiP window, the thumbnail views of the other sub-channels could be displayed in response to a "DISCOVER" button on the DTV remote, or shown as a banner along the lower edge of the display of main channel video.

Figure 10:
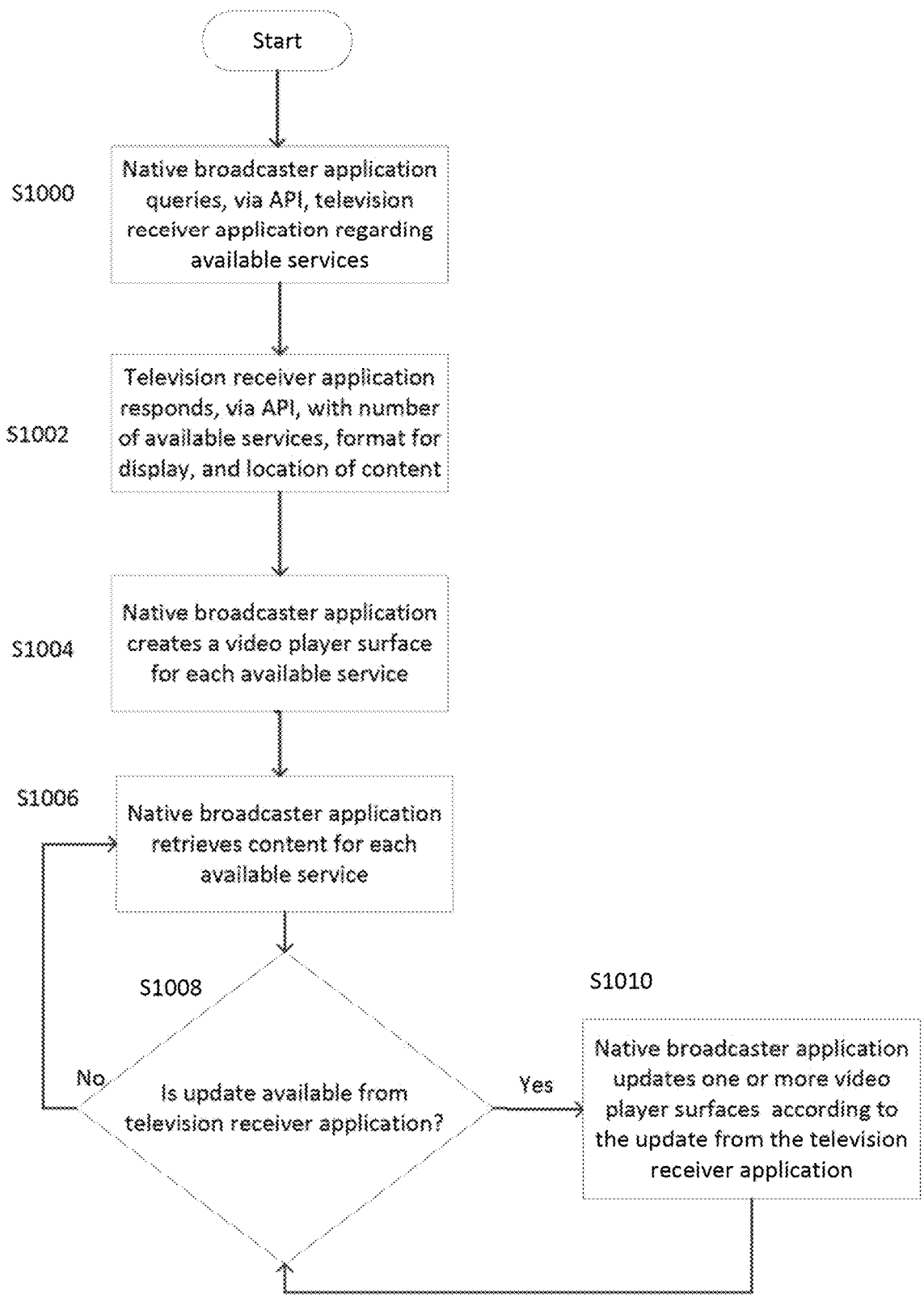
FIG. 10 illustrates an exemplary process performed by a reception apparatus.

FIG. 10 illustrates an embodiment of a process performed by the reception apparatus 200 or DTV receiver 600. In FIG. 10, it is assumed that both a native broadcaster application and a television receiver application are both currently executing. The process may start at step S1000 where the native broadcaster application queries, via the API, the television receiver application regarding available services.

The process proceeds to step S1002 where the television receiver application responds, via the API, with (i) the number of available services, (ii) the format for display, and (iii) a location of the content. For example, referring to FIG. 9, the television receiver application may specify that there are three services available for viewing (e.g., 931, 933, and 935). The television receiver application may further indicate a format for display for these services such as, for example, JPEG format, DASH format, or ATSC format as described above. Additionally, the television receiver application may specify the location of the content. For example, if the television receiver application specifies the format of display to be DASH format, the response by the television receiver application would include a URL to a DASH server, as described above.

The process proceeds to step S1004, where the native broadcaster application creates a video player service for each available service. For example, referring to FIG. 9, when the television receiver application indicates via the API that three services are available for viewing in step S1002, the native broadcaster application creates the video surfaces for 931, 933, and 935. Additionally, the native broadcaster application may create a user interface 901 to display additional information such as in the field specified for 911, 913, and 921.

The process proceeds to step S1006 where the native broadcaster application retrieves content for each available service. For example, when the display format is DASH, the native broadcaster application uses the URL provided by the television receiver application to retrieve the content for each video service that the native broadcaster application created.

The process proceeds to step S1008 where it is determined whether an update is available for the television receiver application. If no update is available, the process returns to step S1006. However, if an update is available, the process proceeds from step S1008 to step S1010 where the native broadcaster application updates one or more video player services according to the update from the television receiver application. For example, in step S1008, the television receiver application may indicate that a new image or frame is available for the video surface corresponding to 931.

Figure 11:
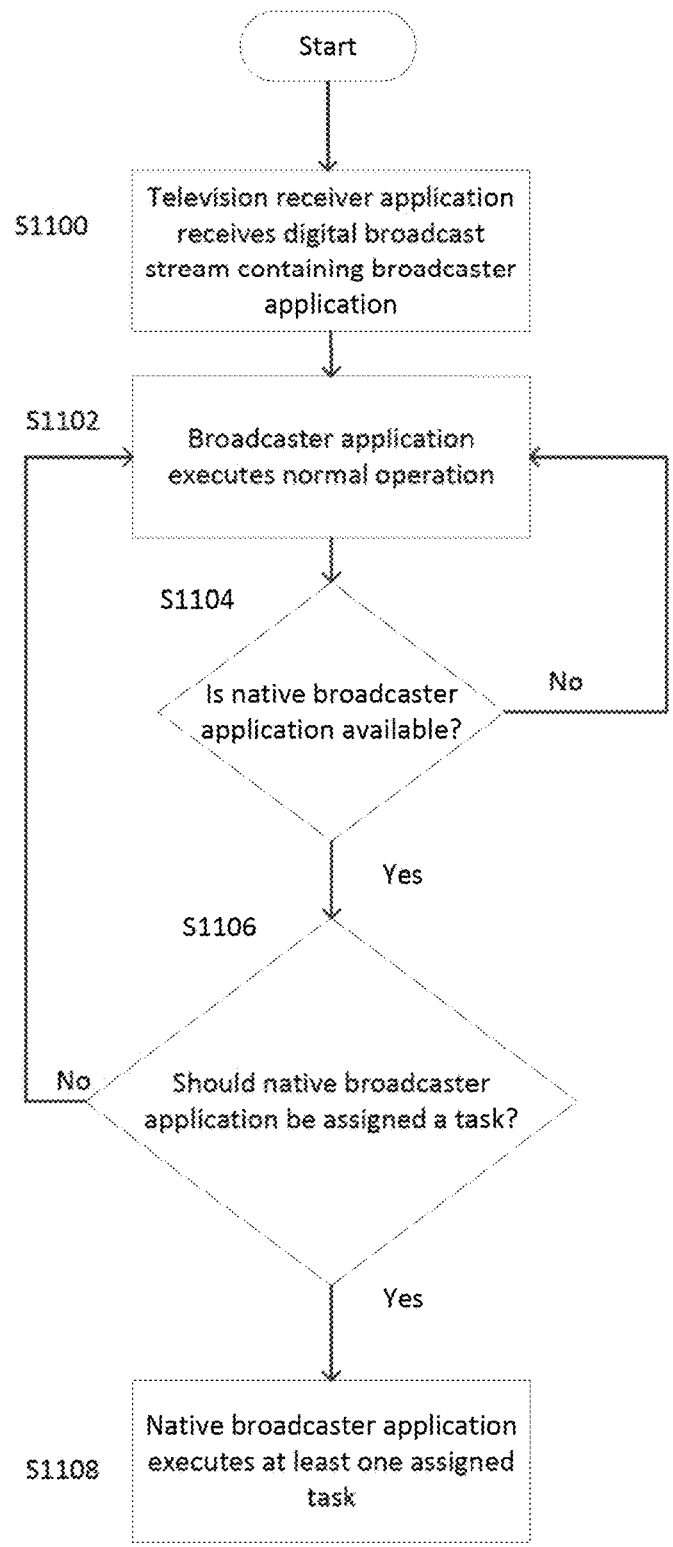
FIG. 11 illustrates an exemplary process performed by a reception apparatus.

FIG. 11 is an embodiment of a process performed by a reception apparatus 200 or DTV receiver 600 to illustrate example communications between a broadcaster application and a native broadcaster application via an API. In the process in FIG. 11, it is assumed that a television receiver application has already been launched. The process may generally start in step S1100 where a television receiver application receives a digital broadcast stream (e.g., an ATSC 3.0 broadcast stream) containing a broadcaster application. As an example, step S1100 may be initiated when a user selects a service for viewing, which causes the television receiver application to issue a command to tuner 605 to tune to a particular RF channel corresponding to the selected service.

The process proceeds to step S1102 where the broadcaster application is launched and executes normal operation. As an example, the broadcaster application may include program code that upon execution, causes the broadcaster application to perform one or more tasks. The process proceeds to step S1104 to determine whether a native broadcaster application is available. In some embodiments, step S1104 is performed by the broadcaster application. For example, the broadcaster application may send a command, via the API, to the television receiver application to determine which native broadcaster applications are available, and/or issue a command, via the API, that causes the television receiver application to launch a particular native broadcaster application. In another example, the native broadcaster application may be launched independently of the broadcaster application, and may be running before the broadcaster application is executed. If no native broadcaster application is available in step S1104, the process returns to step S1102.

If a native broadcaster application is available, the process proceeds to step S1106 to determine whether the native broadcaster application should be assigned a task. For example, referring to the ad replacement example discussed above, if the native broadcaster application is available, the broadcaster application may assign the task of resolving each XLink since the native broadcaster application may have access to information that the broadcaster application may not be able to access.

Furthermore, it may be determined that the native broadcaster application should be assigned a task because the broadcaster application is unable to perform the task. Example tasks that a broadcaster application is not capable of performing include, for example, (i) accessing higher-value content, such as 4K High Dynamic Range (HDR); (ii) accessing Android graphics primitives for drawing; (iii) using touch screen gestures in a tablet or smartphone environment; (iv) accessing Android-supplied and device-specific features such as geolocation, keychain, photo library, and a device camera; (v) adding pay-to-use functionality or accessing to e-commerce functionality; (vi) accessing local memory resources otherwise not available to the broadcaster application; (vii) accessing accounts established by the user in an Android device; (viii) providing linkage to other applications such as e-mail, messaging, or Facebook; and (ix) accessing local user preferences.

If the native broadcaster application should not be assigned a task in steps S1106, the process returns to step S1102. However, if the native broadcaster application is assigned a task, the native broadcaster application executes the assigned task, and the process returns to step S1102.

As mentioned above, in one implementation, the functions and processes of the reception apparatus 200 or receiver 600 may be implemented by one or more respective processing circuits.

Figure 12:
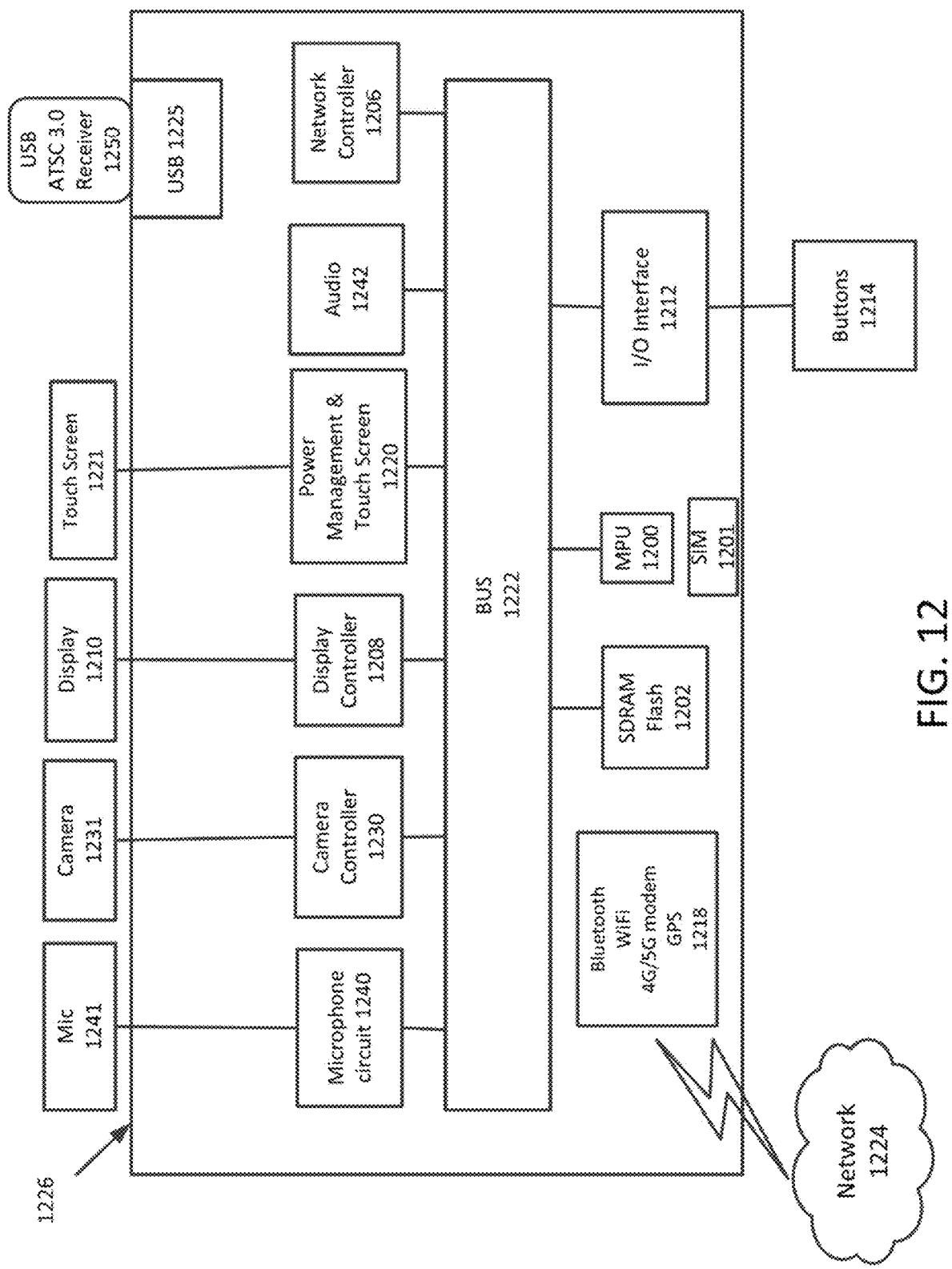
FIG. 12 is an example hardware configuration of a computer.

Next, a hardware description of the processing circuit 1226 according to exemplary embodiments is described with reference to FIG. 12. In FIG. 12, the processing circuit 1226 includes a Micro Processing Unit (MPU) 1200 which performs the processes described herein. The process data and instructions may be stored in memory 1202. These processes and instructions may also be stored on a portable storage medium or may be stored remotely. The processing circuit 1226 may have a replaceable Subscriber Identity Module (SIM) 1201 that contains information that is unique to the network service of the mobile device 121.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 1226 communicates, such as a server or computer.

Further, the claimed advancements may be provided as a utility application, background daemon, or component of an operating system, or combination thereof, executing in conjunction with MPU 1200 and a mobile operating system such as Android, Microsoft® Windows® 10 Mobile, Apple iOS®, Samsung Tizen and other systems known to those skilled in the art.

In order to achieve the processing circuit 1226, the hardware elements may be realized by various circuitry elements, known to those skilled in the art. For example, MPU 1200 may be a Qualcomm mobile processor, a Nvidia mobile processor, an Atom® processor from Intel Corporation of America, a Samsung mobile processor, or an Apple A7 mobile processor, or may be other processor types that would be recognized by one of ordinary skill in the art. Alternatively, the MPU 1200 may be implemented on a Field-Programmable Gate Array (FPGA), Application Specific Integrated Circuit (ASIC), Programmable Logic Device (PLD) or using discrete logic circuits, as one of ordinary skill in the art would recognize. Further, MPU 1200 may be implemented as multiple processors cooperatively working in parallel to perform the instructions of the inventive processes described above.

The processing circuit 1226 in FIG. 12 also includes a network controller 1206, such as an Intel Ethernet PRO network interface card from Intel Corporation of America, for interfacing with network 1224. As can be appreciated, the network 1224 can be a public network, such as the Internet, or a private network such as LAN or WAN network, or any combination thereof and can also include PSTN or ISDN sub-networks. The network 1224 can also be wired, such as an Ethernet network. The processing circuit may include various types of communications processors for wireless communications including 3G, 4G and 5G wireless modems, WiFit®, Bluetooth®, GPS, or any other wireless form of communication that is known.

The processing circuit 1226 includes a Universal Serial Bus (USB) controller 1225 which may be managed by the MPU 1200. In one embodiment, the tuner is a hardware device in an ATSC 3.0 DTV receiver 1250 that can tune to and demodulate an ATSC 3.0 broadcast signal, and produce a sequence of ATSC 3.0 link layer protocol packets.

The processing circuit 1226 further includes a display controller 1208, such as a NVIDIA® GeForce® GTX or Quadro® graphics adaptor from NVIDIA Corporation of America for interfacing with display 1210. An I/O interface 1212 interfaces with buttons 1214, such as for volume control. In addition to the I/O interface 1212 and the display 1210, the processing circuit 1226 may further include a microphone 1241 and one or more cameras 1231. The microphone 1241 may have associated circuitry 1240 for processing the sound into digital signals. Similarly, the camera 1231 may include a camera controller 1230 for controlling image capture operation of the camera 1231. In an exemplary aspect, the camera 1231 may include a Charge Coupled Device (CCD). The processing circuit 1226 may include an audio circuit 1242 for generating sound output signals, and may include an optional sound output port.

The power management and touch screen controller 1220 manages power used by the processing circuit 1226 and touch control. The communication bus 1222, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1226. A description of the general features and functionality of the display 1210, buttons 1214, as well as the display controller 1208, power management controller 1220, network controller 1206, and I/O interface 1212 is omitted herein for brevity as these features are known.

Numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

Embodiments of the present disclosure provide significantly advantageous features such as:
1. Implementation of an ATSC 3.0 receiver on an Android platform;
2. Coding the ATSC 3.0 receiver in Java for portability;
3. Portability of the application to non-DTV hardware via use of a USB-connected Tuner;
4. Ability to hand off interactive functions from the broadcaster's HTML5 application to the broadcaster's Android application;
5. Ability for an Android application provided by a broadcaster to use resources and services made available by the DTV manufacturer's ATSC 3.0 Application to, for example, render broadcast TV in display surfaces it controls;
6. Definition of a proprietary interface between the DTV manufacturer's ATSC 3.0 receiver and the broadcaster's Android application to provide:
   a. Information about DTV Services available for selection or rendering;
   b. Support to allow the Android application to render thumbnail views of the available Services;
   c. A general-purpose communication path the broadcaster can use to communicate between their HTML5 application and their Android application;
   d. Ability for the HTML5 application to query the ATSC 3.0 receiver regarding the presence of a specific Android application;
   e. Ability of the HTML5 application to cause a specific Android application to be launched.
7. Ability of the broadcaster's Android application to render live video in thumbnail format from multiple Services available to the DTV receiver, at frame rates up to full frame rate (no dropped frames), within rectangular windows of a size and position it determines.

(1) A reception apparatus including a memory that stores a television receiver application and a native application and a processor configured to send, by the native application to the television receiver application, a query command regarding a number of services available for display, receive, by the native application from the television receiver application in response to the query command, a query response message including at least a first parameter that specifies a number of associated services available for display, and provide, by the native application, a video surface for each service indicated in the first parameter.

(2) The reception apparatus according to feature (1), in which the query response message further includes a second parameter that specifies a display format and a third parameter that specifies a location of content corresponding to the associated services available for display.

(3) The reception apparatus according to feature (2), in which the display format is one of a JPEG format, a Dynamic Adaptive Streaming over HTTP (DASH) format, and a TV format.

(4) The reception apparatus according to feature (3), in which when the display format is the JPEG format, the third parameter is a uniform resource locator (URL) that points to a server containing a plurality of JPEG images, in which the native application retrieves a first JPEG image from the plurality of JPEG images for each video surface provided by the native application, and in which the television receiver application provides to the native application an updated JPEG image from the server for each video surface provided by the native application.

(5) The reception apparatus according to feature (3), in which when the display format is the DASH format, the third parameter is a uniform resource locator (URL) that points to a DASH server, in which the native application uses the URL to retrieve, from the DASH server, a media presentation description (MPD) file that includes content corresponding to the associated services.

(6) The reception apparatus according to feature (3), in which when the display format is the TV format, the third parameter is a link to a display buffer for each associated service, in which each display buffer includes content of a service received in a digital broadcast stream, and in which the native application attaches a corresponding display buffer to each video surface provided by the native application.

(7) The reception apparatus according to feature (6), in which the television receiver application is configured to provide a full screen video surface to display a user selected service included in the digital broadcast stream, in which each video surface provided by the native application is overlaid over the full screen video surface.

(8) The reception apparatus according to any one of features (1)-(7), in which the native broadcaster application and the television receiver application communicate with each other via an application programming interface (API) that enables direct bidirectional communication between the native broadcaster application and the television receiver application.

(9) A reception apparatus including a memory comprising a native application and a television receiver application; receiver circuitry configured to receive a digital broadcast stream that includes television content and a broadcaster application; and a processor configured to provide, by the television receiver application, a video surface to display the television content, execute the broadcaster application, and execute the native application that is identified by the broadcaster application, in which the native application is configured to perform a task in place of the broadcaster application, cause another broadcaster application to execute in place of the broadcaster application, or provide data not otherwise accessible to the broadcaster application.

(10) The reception apparatus according to feature (9), in which the broadcaster application executes another task while the native application performs the task.

(11) The reception apparatus according to feature (9), in which the broadcaster application waits for the native application to complete the task before the broadcaster application executes another task.

(12) The reception apparatus according to feature (9), in which the native broadcaster application is configured to send a command with a uniform resource locator (URL) to the television receiver application that causes the television receiver application to retrieve the another broadcaster application using the URL to execute in place of the broadcaster application.

(13) The reception apparatus according to feature (9), in which the broadcaster application and native broadcaster application communicate with each other via an application programming interface (API) that enables direct bidirectional communication between the broadcaster application and native broadcaster application.

(14) A non-transitory computer readable medium having instructions stored therein, which when executed by a processor in a reception apparatus causes the processor to execute a method including sending, by a native application to a television receiver application, a query command regarding a number of services available for display, receiving, by the native application from the television receiver application in response to the query command, a query response message including at least a first parameter that specifies a number of associated services available for display, and providing, by the native application, a video surface for each service indicated in the first parameter.

(15) The non-transitory computer readable medium according to feature (14), in which the query response message further includes a second parameter that specifies a display format and a third parameter that specifies a location of content corresponding to the associated services available for display.

(16) The non-transitory computer readable medium according to feature (15), in which the display format is one of a JPEG format, a Dynamic Adaptive Streaming over HTTP (DASH) format, and a TV format.

(17) The non-transitory computer readable medium according to feature (16), in which when the display format is the JPEG format, the third parameter is a uniform resource locator (URL) that points to a server containing a plurality of JPEG images, in which the native application retrieves a first JPEG image from the plurality of JPEG images for each video surface provided by the native application, and in which the television receiver application provides to the native application an updated JPEG image from the server for each video surface provided by the native application.

(18) The non-transitory computer readable medium according to feature (16), in which when the display format is the DASH format, the third parameter is a uniform resource locator (URL) that points to a DASH server, in which the native application uses the URL to retrieve, from the DASH server, a media presentation description (MPD) file that includes content corresponding to the associated services.

(19) The non-transitory computer readable medium according to feature (16), in which when the display format is the TV format, the third parameter is a link to a display buffer for each associated service, in which each display buffer includes content of a service received in a digital broadcast stream, and in which the native application attaches a corresponding display buffer to each video surface provided by the native application.

(20) A non-transitory computer readable medium having instructions stored therein, which when executed by a processor in a reception apparatus causes the reception apparatus to execute a method including receiving circuitry configured to receive a digital broadcast stream that includes television content and a broadcaster application; providing, by a television receiver application, a video surface to display the television content; executing the broadcaster application; and executing a native application that is identified by the broadcaster application, in which the native application is configured to perform a task in place of the broadcaster application, cause another broadcaster application to execute in place of the broadcaster application, or provide data not otherwise accessible to the broadcaster application.

What is claimed is:

1. A reception apparatus, comprising:
a memory that stores a television receiver application and a native application;
a processor configured to:
   send, by the native application to the television receiver application, a query command regarding a number of services available for display,
   receive, by the native application from the television receiver application in response to the query command, a query response message including at least a first parameter that specifies a number of associated services available for display, and
   provide, by the native application, a video surface for each service indicated in the first parameter,
wherein the query response message further includes a second parameter that specifies a display format and a third parameter that specifies a location of content corresponding to the associated services available for display, and
wherein the display format is one of a JPEG format, a Dynamic Adaptive Streaming over HTTP (DASH) format, and a TV format.

2. The reception apparatus according to claim 1, wherein when the display format is the JPEG format, the third parameter is a uniform resource locator (URL) that points to a server containing a plurality of JPEG images,
   wherein the native application retrieves a first JPEG image from the plurality of JPEG images for each video surface provided by the native application, and
   wherein the television receiver application provides to the native application an updated JPEG image from the server for each video surface provided by the native application.

3. The reception apparatus according to claim 1, wherein when the display format is the DASH format, the third parameter is a uniform resource locator (URL) that points to a DASH server,
   wherein the native application uses the URL to retrieve, from the DASH server, a media presentation description (MPD) file that includes content corresponding to the associated services.

4. The reception apparatus according to claim 1, wherein when the display format is the TV format, the third parameter is a link to a display buffer for each associated service,
   wherein each display buffer includes content of a service received in a digital broadcast stream, and
   wherein the native application attaches a corresponding display buffer to each video surface provided by the native application.

5. The reception apparatus according to claim 4, wherein the television receiver application is configured to provide a full screen video surface to display a user selected service included in the digital broadcast stream, wherein each video surface provided by the native application is overlaid over the full screen video surface.

6. The reception apparatus according to claim 1, wherein the native application and the television receiver application communicate with each other via an application programming interface (API) that enables direct bidirectional communication between the native application and the television receiver application.

7. A non-transitory computer readable medium having instructions stored therein, which when executed by a processor in a reception apparatus causes the processor to execute a method comprising:
   sending, by a native application to a television receiver application, a query command regarding a number of services available for display,
   receiving, by the native application from the television receiver application in response to the query command, a query response message including at least a first parameter that specifies a number of associated services available for display, and
   providing, by the native application, a video surface for each service indicated in the first parameter,
wherein the query response message further includes a second parameter that specifies a display format and a third parameter that specifies a location of content corresponding to the associated services available for display, and
wherein the display format is one of a JPEG format, a Dynamic Adaptive Streaming over HTTP (DASH) format, and a TV format.

8. The non-transitory computer readable medium according to claim 7, wherein when the display format is the JPEG format, the third parameter is a uniform resource locator (URL) that points to a server containing a plurality of JPEG images,
   wherein the native application retrieves a first JPEG image from the plurality of JPEG images for each video surface provided by the native application, and
   wherein the television receiver application provides to the native application an updated JPEG image from the server for each video surface provided by the native application.

9. The non-transitory computer readable medium according to claim 7, wherein when the display format is the DASH format, the third parameter is a uniform resource locator (URL) that points to a DASH server,
   wherein the native application uses the URL to retrieve, from the DASH server, a media presentation description (MPD) file that includes content corresponding to the associated services.

10. The non-transitory computer readable medium according to claim 7, wherein when the display format is the TV format, the third parameter is a link to a display buffer for each associated service, wherein each display buffer includes content of a service received in a digital broadcast stream, and wherein the native application attaches a corresponding display buffer to each video surface provided by the native application.

11. The non-transitory computer readable medium according to claim 10, wherein the television receiver application is configured to provide a full screen video surface to display a user selected service included in the digital broadcast stream, wherein each video surface provided by the native application is overlaid over the full screen video surface.

12. The non-transitory computer readable medium according to claim 7, wherein the native application and the television receiver application communicate with each other via an application programming interface (API) that enables direct bidirectional communication between the native application and the television receiver application.

* * * * *